(12) United States Patent
Peppe et al.

(10) Patent No.: US 9,217,806 B2
(45) Date of Patent: Dec. 22, 2015

(54) TOWING METHODS AND SYSTEMS FOR GEOPHYSICAL SURVEYS

(75) Inventors: Oliver Peppe, West Linton (GB); Marit Ronaess, Gjettum (NO)

(73) Assignee: PGS Geophysical AS, Oslo (NO)

( * ) Notice: Subject to any disclaimer, the term of this patent is extended or adjusted under 35 U.S.C. 154(b) by 881 days.

(21) Appl. No.: 13/447,508

(22) Filed: Apr. 16, 2012

(65) Prior Publication Data

US 2013/0272090 A1 Oct. 17, 2013

(51) Int. Cl.
*G01V 1/38* (2006.01)
*G01V 1/20* (2006.01)
*G01V 11/00* (2006.01)

(52) U.S. Cl.
CPC .............. *G01V 1/3808* (2013.01); *G01V 1/20* (2013.01); *G01V 11/00* (2013.01)

(58) Field of Classification Search
CPC ........ G01V 1/20; G01V 11/00; G01V 1/3808
USPC .......................................................... 367/17
See application file for complete search history.

(56) References Cited

U.S. PATENT DOCUMENTS

| | | | |
|---|---|---|---|
| 4,617,518 A | 10/1986 | Srnka | |
| 4,970,696 A * | 11/1990 | Crews et al. | 367/15 |
| 6,234,102 B1 | 5/2001 | Russell et al. | |
| 7,142,481 B1 | 11/2006 | Metzbower et al. | |
| 7,881,153 B2 | 2/2011 | Stokkeland et al. | |
| 8,098,542 B2 | 1/2012 | Hillesund et al. | |
| 2008/0144435 A1 * | 6/2008 | Morley | 367/21 |
| 2008/0192570 A1 | 8/2008 | Tenghamn et al. | |
| 2009/0262601 A1 | 10/2009 | Hillesund et al. | |
| 2010/0172205 A1 | 7/2010 | Hillesund et al. | |
| 2010/0254216 A1 * | 10/2010 | Toennessen | 367/20 |
| 2011/0103179 A1 | 5/2011 | Vageskar et al. | |
| 2011/0203509 A1 | 8/2011 | Austad et al. | |

(Continued)

FOREIGN PATENT DOCUMENTS

| | | |
|---|---|---|
| EP | 2128654 A2 | 12/2009 |
| EP | 2317341 A2 | 5/2011 |
| EP | 2360496 A1 | 8/2011 |

(Continued)

OTHER PUBLICATIONS

MacGregor et al., "Electrical resistivity structure of the Valu Fa Ridge, Lau Basin, from marine controlled-source electromagnetic sounding," Geophys. J. Int. (2001) 146, pp. 217-236.*

(Continued)

*Primary Examiner* — Daniel L Murphy

(57) ABSTRACT

Disclosed are methods and systems for towing one or more electromagnetic sensor streamers from deflectors in an additional geophysical sensor streamer spread. An embodiment discloses a marine geophysical survey system, comprising: a survey vessel; an electromagnetic sensor streamer; and a geophysical sensor streamer spread configured to be towed by the survey vessel, wherein the geophysical sensor streamer spread comprises: sensor streamers configured to be laterally spaced apart from one another; and deflectors adapted to spread the sensor streamers substantially transversely in relation to a direction of motion of the survey vessel, wherein the electromagnetic sensor streamer is configured to be towed from at least one of the deflectors.

24 Claims, 6 Drawing Sheets

(56) References Cited

U.S. PATENT DOCUMENTS

2011/0242940 A1 10/2011 Sudow et al.
2012/0002502 A1 1/2012 Hillesund et al.

FOREIGN PATENT DOCUMENTS

| EP | 2402791 A2 | 1/2012 |
| EP | 2407805 A2 | 1/2012 |
| GB | 2424949 A | 10/2006 |
| WO | 2008032082 A1 | 3/2008 |
| WO | 2010002263 A2 | 1/2010 |
| WO | WO 2011120832 A2 | 10/2011 |

OTHER PUBLICATIONS

Australian Patent Examination Report No. 1 mailed Mar. 7, 2014, in Patent Application No. 2013202466, 5 pages.

Exploration & Production Magazine article for the 2014 Meritorious Awards for Engineering Innovation available from http://www.epmag.com/item/print/2014-Meritorious-Awards-Engineering-Innovation__132699 and http://www.epmag.com dated May 1, 2014.

United Kingdom Search Report, date of search: Oct. 9, 2013.

Johan Mattsson, et al., "Error Analysis and Capability Modeling for Towed Streamer Electromagnetics," First Break, Aug. 2012, pp. 91-96, vol. 30.

Johan Mattsson, et al., "Towed Streamer EM: The Challenges of Sensitivity and Anisotropy" First Break, Jun. 2013, pp. 155-159, vol. 31.

Chris Anderson, et al., "An Integrated Approach to Marine Electromagnetic Surveying Using a Towed Streamer and Source" First Break, May 2010, pp. 71-75, vol. 28.

* cited by examiner

TOWING METHODS AND SYSTEMS FOR GEOPHYSICAL SURVEYS

BACKGROUND

The present invention relates generally to the field of marine geophysical surveying. More particularly, in one or more embodiments, the present invention relates to methods and systems for towing one or more electromagnetic sensor streamers from deflectors in an additional geophysical sensor streamer spread.

Certain types of marine geophysical surveying, such as seismic or electromagnetic surveying, include towing an energy source at a selected depth in a body of water. Actuation of the energy source emits an energy field into the body of water. The energy field interacts with the rock formations below the water bottom with changes in the energy field due to this interaction detected by geophysical sensors positioned in the water. The detected energy is used to infer certain properties of the subsurface rock, such a structure, mineral composition and fluid content, thereby providing information useful in the recovery of hydrocarbons.

Current electromagnetic survey techniques are generally based on towing an electromagnetic source in the body of water while a number of electromagnetic sensors are disposed at a substantially stationary position at the water bottom. Electromagnetic survey systems have also been developed that include towing both the electromagnetic source and a sensor streamer having electromagnetic sensors disposed thereon at spaced apart locations. As the streamer is pulled through the water, one or more hydrodynamic depressors can be used to pull the streamer down to a pre-selected depth. The length of the lead-in cable interconnecting the streamer with the survey vessel can be adjusted to regulate depth of the streamer in combination with the depressors. More fine depth adjustments can be made with depth control devices cooperatively engaged with the streamer. In some instances, it may be desirable to tow more than one sensor streamer in parallel in an electromagnetic survey. To achieve the desired separation between the sensor streamers (e.g., 500 meters), specially designed submersible deflectors have been proposed for providing the lateral component of force needed to create the desired lateral spread between streamers while also providing downward force to maintain the streamers at the desired towing depth. However, the development and operation of the submersible deflectors may add undesired cost and complexity to the electromagnetic survey system.

Accordingly, there is a need for improved methods and systems for marine electromagnetic surveying.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine geophysical surveying. More particularly, in one or more embodiments, this invention relates to methods and systems for towing one or more electromagnetic sensor streamers from deflectors in an additional geophysical sensor streamer spread.

One of the many potential advantages of the systems and methods of the present invention, only some of which are disclosed herein, is that seismic and electromagnetic sensor streamers can be towed at the same time, thus allowing for collection of both seismic and electromagnetic data that can be used to infer properties of the subsurface rock. Accordingly, the expense and complexity associated with separate surveys for collection of this data can be avoided in the present example. Another one of the many potential advantages of the systems and methods of the present invention is that a marine electromagnetic survey system may be used in a three-dimensional survey arrangement. For example, it is believed that the electromagnetic streamers may be towed from the marine seismic survey spread while achieving the desired spread between the electromagnetic streamers. As the electromagnetic streamers are towed from the marine seismic survey spread, the electromagnetic sensor streamers can be towed with the desired spread without the need for a specialized submersible deflector. Accordingly, the cost and complexity associated with development of the specialized submersible deflector can be reduced with use of the marine seismic survey spread to tow the electromagnetic sensor streamers.

In one embodiment, the methods and systems may be used to tow one or more electromagnetic sensor streamers at a depth of at least about 25 meters and at a depth of at least about 100 meters in another embodiment. In one particular embodiment, the electromagnetic sensor streamers may be towed at a depth up to about 500 meters or more. In one embodiment, the methods and systems may be used to achieve a spread between the outermost electromagnetic sensor streamers of at least about 150 meters, at least about 500 meters in another embodiment, and at least about 1,000 meters in yet another embodiment. In one particular embodiment, the methods and systems may be used to achieve a spread between the outermost electromagnetic sensor streamers up to about 1,500 meters.

Figure 1:
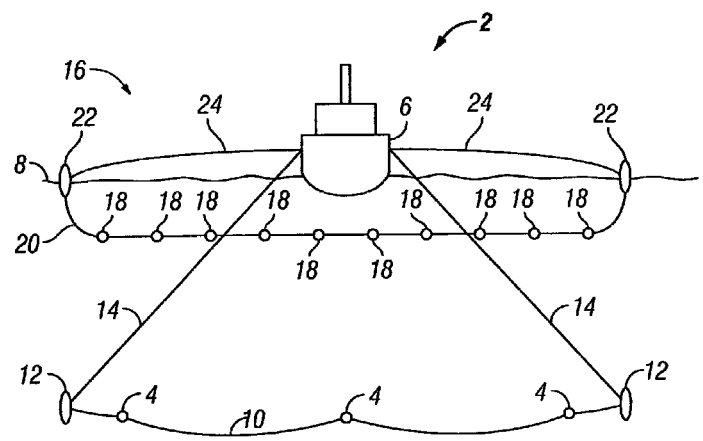
FIG. 1 illustrates one embodiment for towing one or more electromagnetic sensor streamers.

Referring now to FIG. 1, an embodiment of a marine geophysical survey system 2 is illustrated. As illustrated, the marine geophysical survey system 2 may comprise one or more electromagnetic sensor streamers 4 towed by a survey vessel 6 on the surface of a body of water 8, such as a lake or ocean. The electromagnetic sensor streamers 4 may be coupled at their forward ends (with respect to the direction of motion of the survey vessel 6) to one or more spreader lines 10 which extend between the electromagnetic sensor streamers 4. Specially designed submersible deflectors 12 may be coupled to the spreader lines 10 to provide the lateral component of force needed to create the desired lateral spread between electromagnetic sensor streamers 4 while also providing downward force to maintain the electromagnetic sensor streamers 4 at the desired towing depth. In general, the submersible deflectors 12 do not have a surface reference and are free to move on a vertical plane. Tow lines 14 may couple the submersible deflectors 12 to the survey vessel 6. As shown by FIG. 1, the marine geophysical survey system 2 may further include a seismic survey spread 16 towed through the body of water 8 by the survey vessel 6. The seismic survey spread 16 may comprise seismic sensor streamers 18 having one or more spreader lines 20 extending there between. Deflectors 22 may be coupled at each end of the spreader lines 20 for spreading the seismic sensor streamers 18 transversely with respect to the direction of motion of the survey vessel 6. Tow lines 24 may couple the deflectors 22 to the survey vessel 6.

Figure 2:
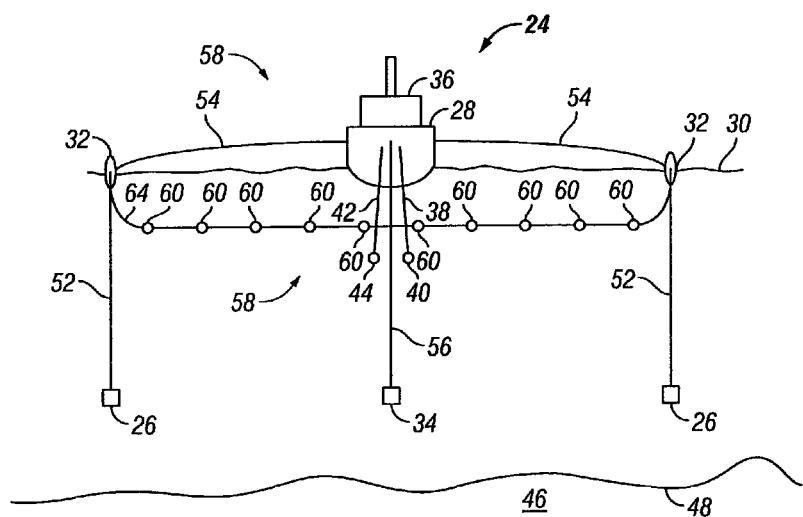
FIGS. 2 and 3 illustrate one embodiment of a marine geophysical survey system comprising one or more electromagnetic sensor streamers towed from deflectors in an additional geophysical sensor streamer spread, in end view and plan view, respectively.
Figure 3:
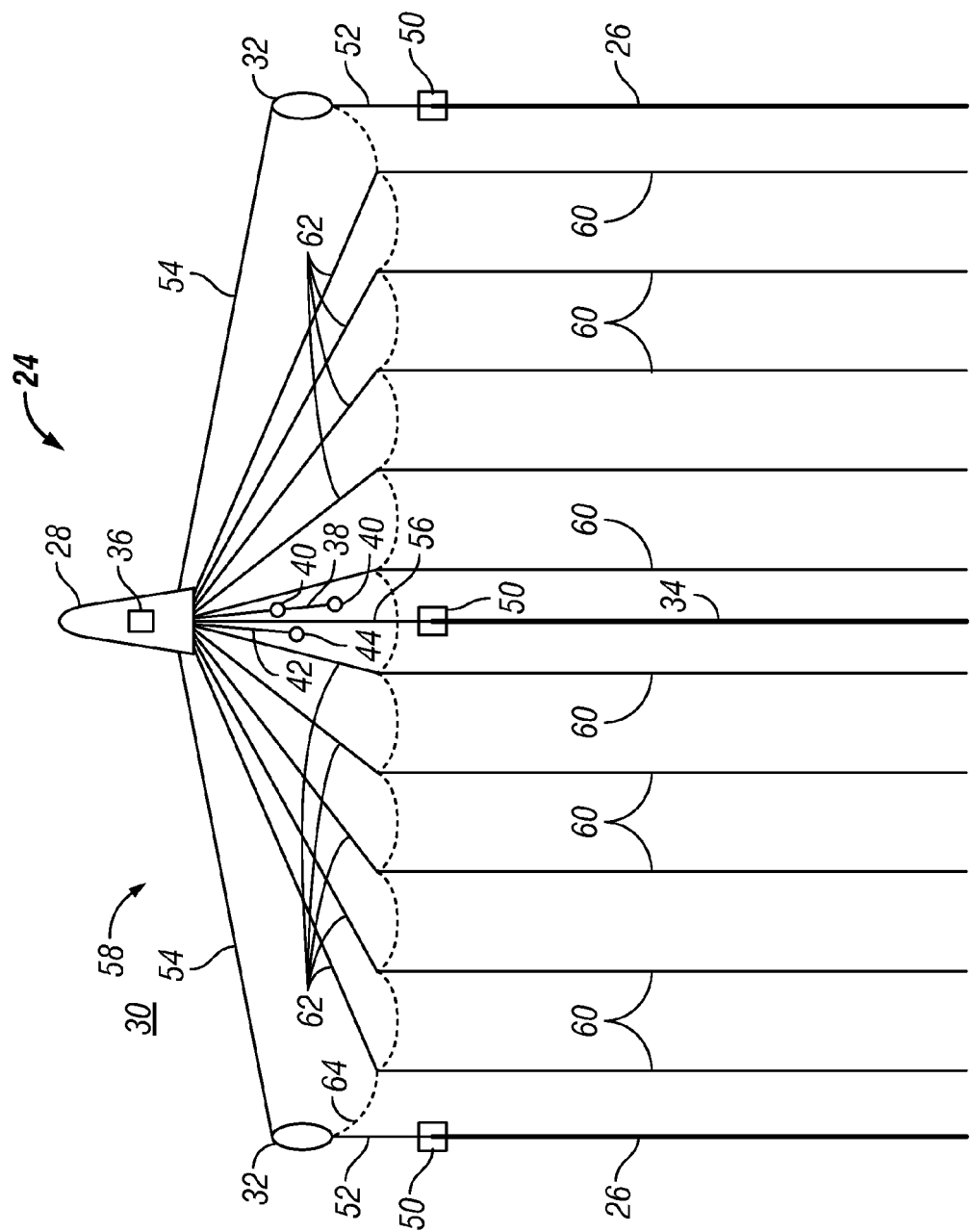

Referring now to FIGS. 2 and 3, a marine geophysical survey system 24 is illustrated in accordance with one embodiment of the present invention. In the illustrated embodiment, the marine geophysical survey system 24 comprises electromagnetic sensor streamers 26 towed by a survey vessel 28 on the surface of a body of water 30, such as a lake or ocean. As further illustrated, the electromagnetic sensor streamers 26 may be towed by the survey vessel 28 from deflectors 32 positioned at or near the surface of the body of water 30, for example. By towing the electromagnetic sensor streamers 26 from the deflectors 32 rather than the submersible deflectors 12 shown on FIG. 1, the expense and complexity associated with the submersible deflectors 12 may be avoided. The marine geophysical survey system 24 may further comprise a central electromagnetic sensor streamer 34 in the illustrated embodiments.

In the present example, the marine geophysical survey system 24 may be configured to be towed through the body of water 30 by the survey vessel 28. The survey vessel 28 may include thereon equipment, shown generally at 36 and referred to for convenience as a "recording system." The recording system 36 may include devices (none shown separately) for navigation of the survey vessel 28, for actuating one or more energy sources at selected times, and/or for recording and processing signals generated by sensors (such as electromagnetic sensors (not shown) on the electromagnetic sensor streamers 26) in the marine geophysical survey system 24. The one or more energy sources may be any selectively actuable source used for subsurface geophysical surveying, including without limitation, one or more seismic energy sources, such as seismic air guns, water guns, vibrators, or arrays of such devices, or one or more electromagnetic fields transmitters, such as electrodes or loop transmitters. For example, the survey vessel 28 may tow a source cable 38, which includes one or more electrodes 40 for generation of an electromagnetic field. By way of further example, the survey vessel 28 may also tow another source cable 42, which may include one or more seismic energy sources 44 for imparting seismic energy into the water, which may be a seismic air gun, a water gun, a vibrator, or an array of such devices, for example.

As illustrated, the geophysical survey system 24 may comprise electromagnetic sensor streamers 26 that are laterally spaced out from one another. "Lateral" or "laterally," in the present context, means transverse to the direction of the motion of the survey vessel 28. The electromagnetic sensor streamers 26 may be configured to be towed by the survey vessel 28 from the deflectors 32. In the illustrated embodiment, one of the electromagnetic sensor streamers 26 is towed from each of the deflectors 32. As illustrated, the electromagnetic sensor streamers 26 may comprise two electromagnetic sensor streamers 26 configured to be towed from the deflectors 32, wherein the two electromagnetic sensor streamers 26 may be the outermost of the electromagnetic sensor streamers 26 in the geophysical survey system 24, with each of the two electromagnetic sensor streamers 26 towed from a separate one of the deflectors 32. The electromagnetic sensor streamers 26 may be selected from those commonly used in the industry. For example, the electromagnetic sensor streamers 26 may be formed by coupling a plurality of streamer segments end-to-end as explained in U.S. Pat. No. 7,142,481. A plurality of electromagnetic sensors (not shown) may be disposed at spaced apart locations along the electromagnetic sensor streamers 26. By way of example, the electromagnetic sensors may include, without limitation, any of a variety of electromagnetic field sensors, such as sensors that use electrodes for measuring electric potential or magnetometers for measuring magnetic field strength. In some embodiments, the electromagnetic sensors may generate response signals, such as electrical or optical signals, in response to detecting changes in the electric field generated by an energy source (e.g., electrodes 40) due to interaction of the electric field with rock formations 46 beneath the water bottom 48. The electromagnetic sensor streamers 26 may each comprise one or more additional components suitable for use in geophysical survey systems, such as LFD control devices, depth sensors, tilt sensors, and hydrodynamic depressors (e.g., hydrodynamic depressors 50 shown on FIG. 3). While the preceding description is directed to active electromagnetic surveying in which an energy source is used to generate an electromagnetic field, embodiments also may include passive electromagnetic surveying in which the electromagnetic sensors detect natural ground signals (e.g., magnetotellurics).

In one embodiment, the electromagnetic sensor streamers 26 may each comprise an LFD control device (not shown) disposed on the electromagnetic sensor streamers 26. The LFD control devices may be deployed, for example, to regulate streamer depth so that the electromagnetic sensor streamers 26 may be kept as level as possible while towed through the water 30. The LFD control devices may be any of a variety of different devices suitable for regulating streamer depth, including "birds" having variable-incidence wings. One example of an LFD control device is described in U.S. Patent Application No. 2008/0192570.

In one embodiment, the electromagnetic sensor streamers 26 may comprise hydrodynamic depressors 50, as best seen on FIG. 3. As illustrated, each of the electromagnetic sensor streamers 26 may comprise at least one of the hydrodynamic depressors 50. In one embodiment, at least one of the hydrodynamic depressors 50 may be disposed on the forward end of each of the electromagnetic sensor streamers 26. In general, the hydrodynamic depressor 50 may be deployed on each of the electromagnetic sensor streamers 26, for example, to provide downward thrust on the electromagnetic sensor streamers 26, thereby forcing them down in the water 30 to a preselected depth. The hydrodynamic depressors 50 may be any of a variety of different devices for forcing down the electromagnetic sensor streamers 26, including passive devices, such as depth control foils or weights, or active devices that may include a propeller or some other means for generating downward thrust. Other types of devices, such as active or passive devices, may also be installed on the electromagnetic sensor streamers 26 as desired to further achieve, for example, the desired survey depth.

In the illustrated embodiment, each of the electromagnetic sensor streamers 26 may be coupled to the corresponding one of the deflectors 32 using a corresponding one of the electromagnetic sensor lead-in lines 52. As illustrated, the electromagnetic sensor lead-in lines 52 are used, for example, to deploy the electromagnetic sensor streamers 26 from the deflectors 32 and to maintain the electromagnetic sensor streamers 26 at a selected distance behind the deflectors 32. As illustrated, each of the electromagnetic sensor lead-in lines 52 may be coupled at a distal end (with respect to the direction of the survey vessel 28) to the corresponding one of the electromagnetic sensor streamers 26. While not illustrated, the electromagnetic sensor lead-in lines 32 may further extend from the deflectors 32 to the survey vessel 28. In some embodiments, the electromagnetic sensors lead-in lines 52 may extend to the survey vessel 28 for transmission of power and/or other signals. In other embodiments, the electromagnetic sensors lead-lines 52 may terminate at the deflectors 32 with another device, such as a radio-link for signal communication to the survey vessel 28. In these embodiments, power may be generated at the deflectors 32, for example, with a turbine or some other means. The electromagnetic sensor lead-in lines 52 may be, for example, any of a variety of spoolable lines suitable for use in electromagnetic survey systems, including, without limitation, fiber ropes, armored cables, or any similar device or combination thereof. In some embodiments, the electromagnetic sensor lead-in lines 52 may transmit towing force from the survey vessel 28 to the electromagnetic sensor streamers 26 via the deflectors 32 such that separate deflector tow lines 54 may not be required. In some embodiments, the electromagnetic sensor lead-in lines 32 may communicate power and/or signals between the recording system 36 and the various electronic components of the electromagnetic sensor streamers 26.

In addition to the electromagnetic sensor streamers 26, the geophysical survey system 22 illustrated by the embodiment shown on FIGS. 2 and 3 further may comprise central electromagnetic sensor streamer 34 configured to be towed from the survey vessel 28 between the electromagnetic sensor streamers 26. In the illustrated embodiment, the central electromagnetic sensor streamer 34 is towed directly from the survey vessel 28 and not from the deflectors 32. The central electromagnetic sensor streamer 34 may be configured similar to the electromagnetic sensor streamers 26. As illustrated, the central electromagnetic sensor streamer 34 may comprise at least one hydrodynamic depressor 50 at a forward end thereof, for example, to force the central electromagnetic sensor streamer 34 down to a pre-selected depth.

In the illustrated embodiment, the central electromagnetic sensor streamer 34 may be coupled to the survey vessel 28 by a central electromagnetic sensor lead-in line 56. As illustrated, the central electromagnetic sensor lead-in line 56 is used, for example, to deploy the central electromagnetic sensor streamer 34 from the survey vessel 28 and to maintain the central electromagnetic sensor streamer 34 at a selected distance behind the survey vessel 28. In one embodiment, the length of the central electromagnetic sensor lead-in line 56 may be controlled to obtain a desired depth as the central electromagnetic sensor streamer 34 is towed through the water 30. At times, the desired depth for the electromagnetic sensor streamer 34 may be substantially similar to that of one or both electromagnetic sensor streamers 26. At other times, each of the electromagnetic sensor streamers 26 and/or the central electromagnetic sensor streamer 34 may have different depths. As illustrated, the central electromagnetic sensor lead-in line 56 may be coupled at one end to the survey vessel 28 and at an opposite end to the central electromagnetic sensor streamer 34. The central electromagnetic sensor lead-in line 56 may be, for example, any of a variety of spoolable lines suitable for use in electromagnetic survey systems, including, without limitation, fiber ropes, annored cables, or any similar device or combination thereof. In some embodiments, the central electromagnetic lead-in line 56 may transmit towing force from the survey vessel 28 to the central electromagnetic sensor streamer 34. In some embodiments, the central electromagnetic sensor lead-in line 56 may communicate power and/or signals between the recording system 36 and the various electronic components of the central electromagnetic sensor streamer 34.

In some embodiments, the geophysical survey system 24 may further comprise an additional geophysical sensor streamer spread, which may include electromagnetic sensor streamers or seismic sensor streamers, for example. In the illustrated embodiment, the geophysical survey system 24 may further comprise a seismic survey spread 58. By towing electromagnetic sensor streamers 26 in addition to the seismic survey spread 58, the geophysical survey system 24 can collect both seismic and electromagnetic survey data, in accordance with present embodiments. As illustrated, the seismic survey spread 58 may comprise seismic sensor streamers 60 that are laterally spaced out from one another. In some embodiments, the seismic sensor streamers 60 may be towed through the water 30 at a desired depth for the seismic survey. For example, the seismic sensor streamers 60 may be towed at a depth of up to about 25 meters, in one embodiment, and up to about 15 meters in another embodiment. In one embodiment, the seismic sensor streamers 60 may be towed at a depth in the range of from about 6 meters to about 25 meters. The seismic sensor streamers 60 may each be formed, for example, by coupling a plurality of streamer segments end-to-end as explained in U.S. Pat. No. 7,142,481, the disclosure of which is incorporated herein by reference. A plurality of seismic sensors (not shown) may be disposed at spaced apart locations along the seismic sensor streamers 60. The seismic sensors may be, without limitation, geophones, hydrophones, or accelerometers, for example. The seismic sensors may generate response signals, such as electrical or optical signals, in response to detecting energy emitted from the seismic energy source 44 after the energy has interacted with rock formations 46 below the water bottom 48. In one embodiment, the seismic sensor streamers 60 may each include a lateral force and depth ("LFD") control device (not shown) disposed on the seismic sensor streamers 60. The LFD control devices may be deployed, for example, to regulate streamer depth so that the seismic sensor streamers 60 may be kept as level as possible while towed through the water 30. The LFD control devices may be any of a variety of different devices suitable for regulating streamer depth, including "birds" having variable-incidence wings. One example of an LFD control device is described in U.S. Patent Application No. 2008/0192570, the disclosure of which is incorporated herein by reference. It should be noted that, while the present example, shows ten seismic sensor streamers 60, the invention is applicable to any number of seismic sensor streamers 60 towed by survey vessel 28 or any other vessel. For example, in some embodiments, more or less than ten seismic sensor streamers 60 may be towed by the survey vessel 28.

In an embodiment, the seismic sensor streamers 60 may be coupled to the survey vessel 28 using a corresponding lead-in line, such as seismic lead-in lines 62, as best seen on FIG. 3. In the illustrated embodiment, the seismic lead-in lines 62 are used, for example, to deploy the seismic sensor streamers 60 from the survey vessel 28 and to maintain the seismic sensor streamers 60 at a selected distance behind the survey vessel 28. As illustrated, each of the seismic lead-in lines 62 may be coupled at one end to the survey vessel 28 and an opposite end to the corresponding seismic sensor streamer 60. The seismic lead-in lines 62 may be, for example, any of a variety of spoolable lines suitable for use in marine geophysical survey systems, including, without limitation, fiber ropes, armored cables, or any similar device or combination thereof. In some embodiments, the seismic lead-in lines 62 may transmit towing force from the survey vessel 28 to the seismic sensor streamers 60. In some embodiments, the seismic lead-in lines 62 may communicate power and/or signals between the recording system 36 and the various electronic components seismic sensor streamers 60.

In the illustrated embodiment, the seismic sensor streamers 60 are coupled at their forward ends (with respect to the direction of motion of the survey vessel 28) to spreader line 64, which extends between the deflectors 32. As illustrated, the spreader line 64 may interconnect the seismic sensor streamers 60. In general, the spreader line 64 may extend in the water 30 substantially transversely to the direction of motion of the survey vessel 28 and, for example, when maintained in correct tension, should help to maintain the lateral positions of the forward ends of the seismic sensor streamers 60. In some embodiments, the spreader line 64 may comprise one or more interconnected lines that extend between the deflectors 32. The spreader line 64 may be, for example, any of a variety of lines suitable for use in geophysical survey systems, including, without limitation, fiber ropes, armored cables, or any similar device or combination thereof.

As illustrated, one of the deflectors 32 may be coupled at each end of the spreader line 64. The spreader line 64 may generally be adapted to spread the seismic sensor streamers 60 substantially transversely in relation to the direction of motion of the survey vessel 28. A variety of suitable deflectors 32 are known and used in the industry. In present embodiments, the deflectors 32 are each shaped to provide a lateral component of force to the corresponding seismic sensor streamers 60 as the deflectors 32 are moved through the water 30. The lateral component of force of each of the deflectors 32 is opposed to that of the other one of the deflectors 32, and is generally, for example, in a direction transverse to the direction of the motion of the survey vessel 28. The combined lateral motion of the deflectors 32 should separate the deflectors 32, for example, from each other until they place the seismic sensor streamers 60 in selected lateral positions. In one example, the separation is selected to place tension in the spreader line 64. The present embodiments are applicable to both passive and active systems for generating the desired lateral force. In some embodiments, the deflectors 32 may comprise one or more foils or wings that create lateral thrust as the deflectors 32 are moved through the water 30. Deflectors 32 that may be used, in certain embodiments, include one-foil, two-foil, or multi-foil deflectors, for example. In some embodiments, the deflectors 32 may have a surface reference (not shown), such as an attached buoy or other flotation device, to restrict movement in the vertical plane. It should be noted that, while the present example shows only two deflectors 32, the invention is applicable to any number of deflectors 32 that may be used as desired for a particular application. For example, while not shown, more than two deflectors 32 may be used in some embodiments.

In an embodiment, the deflectors 32 may be coupled to the survey vessel 28 using deflector tow lines 54. In the illustrated embodiment the deflector tow lines 54 are used, for example, to deploy the deflectors 32 from the survey vessel 28 and to maintain the deflectors 32 at a selected distance behind the vessel 28. In one embodiment, the length of the deflector tow lines 54 may be controlled to obtain a desired depth as the deflectors 32 are towed through the water 30. As illustrated, each of the deflector tow lines 54 may be coupled at one end to the survey vessel 28 and at an opposite end to the corresponding one of the deflectors 32. The deflector tow lines 54 may be, for example, any of a variety of spoolable lines suitable for use in geophysical survey systems, including, without limitation, fiber ropes, armored cables, or any similar device or combination thereof. In some embodiments, the deflector tow lines 54 may transmit towing force from the survey vessel 28 to the deflectors 32. In some embodiments, the deflector tow lines 54 may communicate power and/or signals between the recording system 36 and the various electronic components of the marine geophysical survey system 2.

Figure 4:
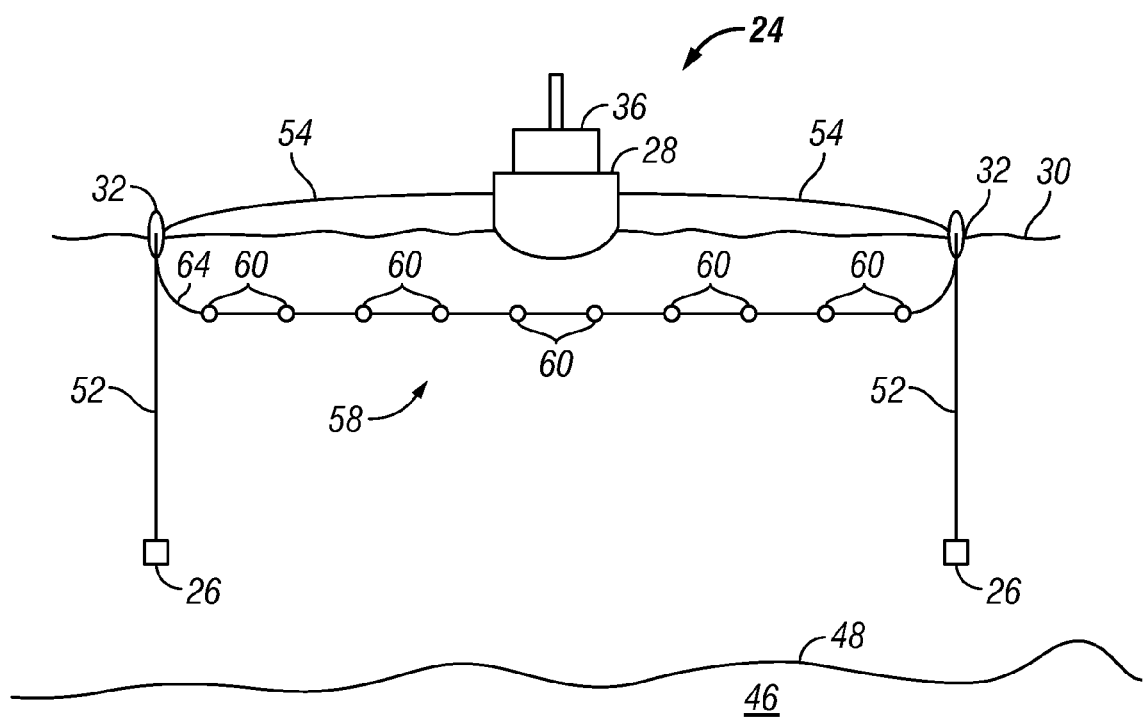
FIGS. 4 and 5 illustrate an alternative embodiment of a marine geophysical survey system comprising one or more electromagnetic sensor streamers towed from deflectors in an additional geophysical sensor streamer spread, in end view and plan view, respectively.
Figure 5:
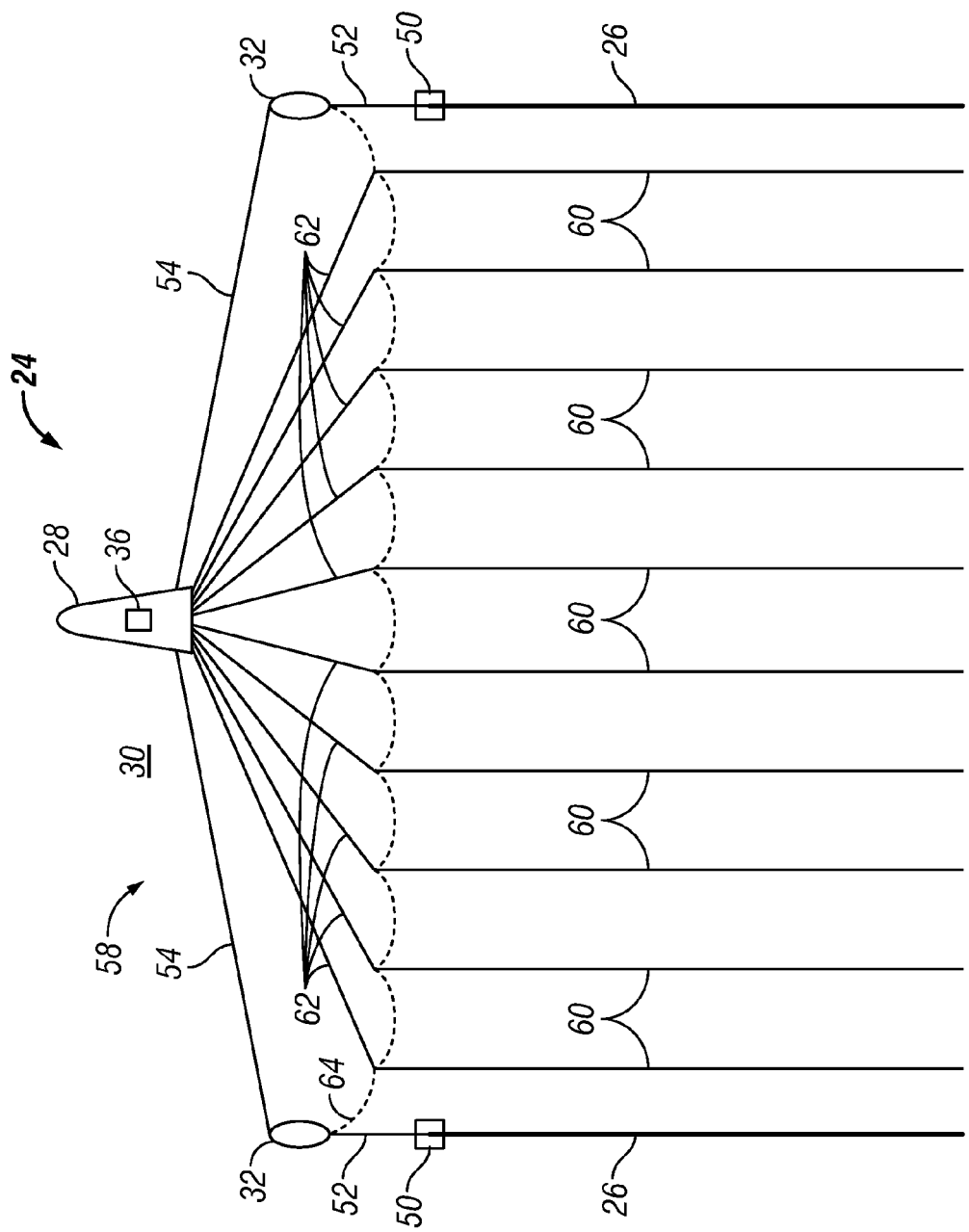

Referring now to FIGS. 4 and 5, an alternative embodiment of a marine geophysical survey system 24 is illustrated. In the illustrated embodiment, the marine geophysical survey system 24 comprises a seismic survey spread 58 that comprises seismic sensor streamers 60 towed by a survey vessel 28 on the surface of a body of water 30, such as a lake or ocean. As illustrated, the seismic survey spread 58 may further include deflectors 32 adapted to spread the seismic sensor streamers 60 transversely in relation to the direction of motion of the survey vessel 28. In accordance with present embodiments, the marine geophysical survey system 24 may further comprise one or more electromagnetic sensor streamers 26 towed from each of the deflectors 32. However, in contrast to the embodiment illustrated by FIGS. 2 and 3, the embodiment shown on FIGS. 4 and 5 does not comprise a central electromagnetic sensor streamer 34 towed from the survey vessel 28.

Figure 6:
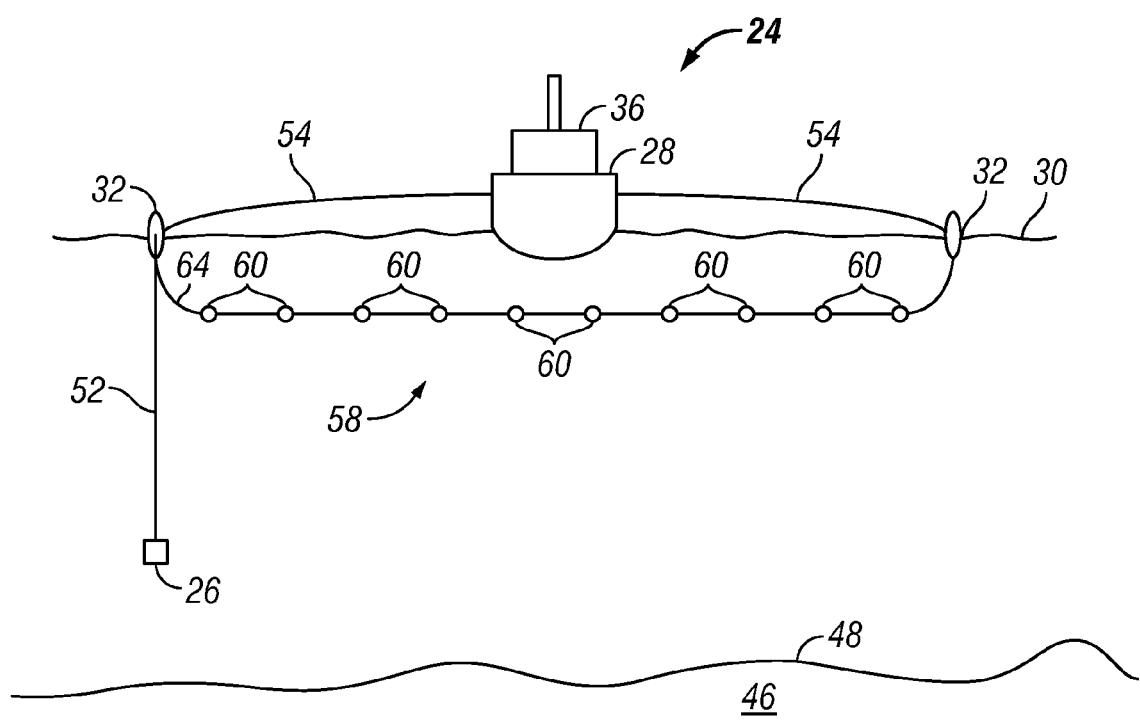
FIGS. 6 and 7 illustrate another alternative embodiment of a marine geophysical survey system comprising one or more electromagnetic sensor streamers towed from deflectors in an additional geophysical sensor streamer spread, in end view and plan view, respectively.
Figure 7:
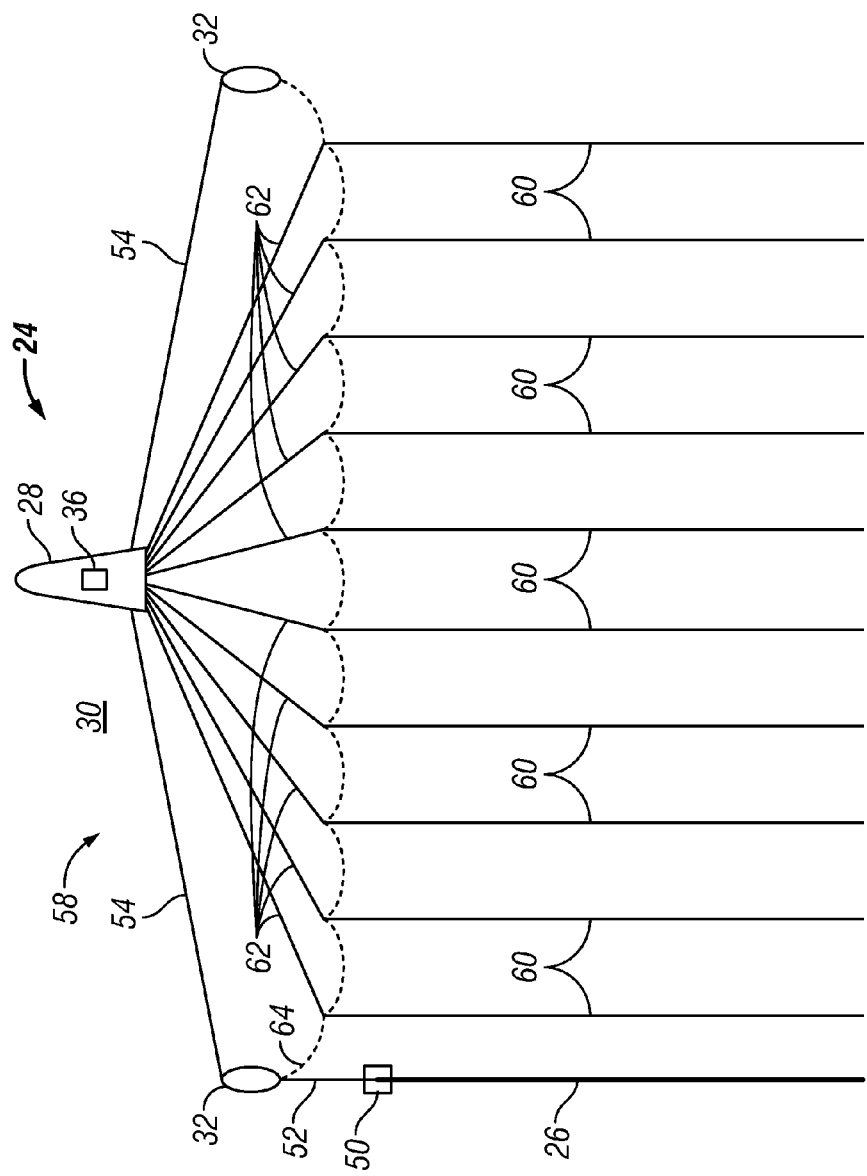

Referring now to FIGS. 6 and 7, an alternative embodiment of a marine geophysical survey system 24 is illustrated. In the illustrated embodiment, the marine geophysical survey system 24 comprises a seismic survey spread 58 that comprises seismic sensor streamers 60 towed by a survey vessel 28 on the surface of a body of water 30, such as a lake or ocean. As illustrated, the seismic survey spread 58 may further include deflectors 32 adapted to spread the seismic sensor streamers 60 transversely in relation to the direction of motion of the survey vessel 28. In accordance with present embodiments, the marine geophysical survey system 24 may further comprise an electromagnetic sensor streamer 26 towed from one of the deflectors 32. However, in contrast to the embodiment illustrated by FIGS. 2 and 3, the embodiment shown on FIGS. 6 and 7 does not comprise electromagnetic sensor streamers 26 towed from both of the deflectors 32. Instead, an electromagnetic sensor streamer 26 is towed from only one of the deflectors 32. In addition, the illustrated embodiment also does not comprise a central electromagnetic sensor streamer 34 towed from the survey vessel 28.

Figure 8:
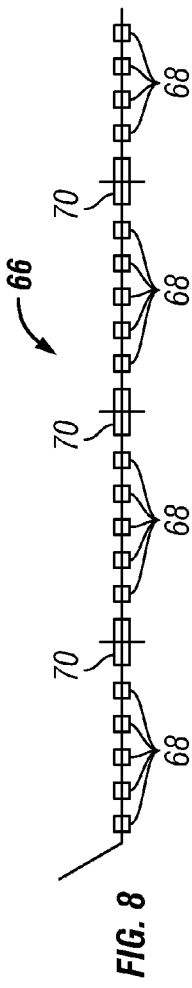
FIG. 8 is a schematic view of a sensor streamer in accordance with one embodiment of the present invention.

FIG. 8 illustrates a geophysical sensor streamer 66 in accordance with embodiments of the present invention. In accordance with present embodiments, the geophysical sensor streamer 66 may be a seismic sensor streamer (e.g., seismic sensor streamers 60 on FIGS. 2-7) or an electromagnetic sensor streamer (e.g., electromagnetic sensor streamers 26 on FIGS. 2-7, central electromagnetic sensor streamer 34 on FIGS. 2-3), as previously described. As illustrated, the geophysical sensor streamer 66 may comprise a plurality of geophysical sensors 68 disposed at spaced apart locations along the geophysical sensor streamer 66. The geophysical sensors 68 may be, without limitation, seismic sensors such as geophones, hydrophones, or accelerometers, or electromagnetic field sensors, such as electrodes or magnetometers, or any combination thereof. In one embodiment, the geophysical sensor streamer 66 may comprise LFD control devices 70 disposed on the geophysical sensor streamer 66. The LFD control devices 70 may be deployed, for example, to regulate streamer depth so that the geophysical sensor streamer 66 may be kept as level as possible while towed through the water (e.g., water 30 on FIGS. 2-7). The LFD control devices 70 may be any of a variety of different devices suitable for regulating streamer depth, including "birds" having variable-incidence wings. One example of an LFD control device is described in U.S. Patent Application No. 2008/0192570. Other suitable devices for use in geophysical surveys may also be included on the geophysical sensor streamer 66, including without limitation depth sensors, tilt sensors, and hydrodynamic depressors (e.g., hydrodynamic depressors 30 on FIGS. 2-7).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or teen in this specification and one or more patent or other documents that may be incorporated herein by reference, the definitions that are consistent with this specification should be adopted for the purposes of understanding this invention.

What is claimed is:

1. A marine geophysical survey system, comprising:
   a survey vessel;
   an electromagnetic sensor streamer; and
   a geophysical sensor streamer spread configured to be towed by the survey vessel, wherein the geophysical sensor streamer spread comprises:
   sensor streamers configured to be laterally spaced apart from one another; and
   deflectors adapted to spread the sensor streamers substantially transversely in relation to a direction of motion of the survey vessel, wherein the electromagnetic sensor streamer is configured to be towed from at least one of the deflectors, and wherein the electromagnetic sensor streamer is configured to be towed at a greater depth than the geophysical sensor streamer spread.

2. The system of claim 1, further comprising an additional electromagnetic sensor streamer configured to be towed by the survey vessel from one of the deflectors.

3. The system of claim 2, wherein the marine geophysical survey system is configured to achieve a spread between the electromagnetic sensor streamer and the additional electromagnetic sensor streamer of at least about 150 meters.

4. The system of claim 2, further comprising a central electromagnetic sensor streamer configured to be towed from the survey vessel between the electromagnetic sensor streamer and the additional electromagnetic sensor streamer.

5. The system of claim 4, wherein the central electromagnetic sensor streamer is configured to be towed at substantially the same depth as the electromagnetic sensor streamer and the additional electromagnetic sensor streamer.

6. The system of claim 4, wherein the central electromagnetic sensor streamer is configured to be towed at a different depth than the electromagnetic sensor streamer and the additional electromagnetic sensor streamer.

7. The system of claim 1, further comprising a lead-in line coupled at one end to one of the deflectors and at an opposite end to the electromagnetic sensor streamer.

8. The system of claim 1, wherein the electromagnetic sensor streamer is configured to be towed at a depth of at least about 25 meters, and wherein the sensor streamers of the geophysical sensor streamer are configured to be towed at a depth of up to about 25 meters.

9. The system of claim 1, wherein the electromagnetic sensor streamer is configured to be towed at a depth of at least about 100 meters.

10. The system of claim 1, wherein the sensor streamer of the geophysical sensor streamer spread comprises a seismic sensor streamer.

11. The system of claim 1, wherein the electromagnetic sensor streamer comprises electromagnetic sensors disposed at spaced apart locations along the electromagnetic sensor streamer.

12. The system of claim 1, wherein the electromagnetic sensor streamer comprises a hydrodynamic depressor at a forward end of the electromagnetic sensor streamer.

13. The system of claim 1, wherein a lateral force and depth control device is disposed on the electromagnetic sensor streamer.

14. A marine geophysical survey system, comprising:
   a survey vessel;
   a seismic survey spread configured to be towed by the survey vessel wherein the seismic survey spread comprises:
   seismic sensor streamers configured to be laterally spaced apart from one another;
   a spreader line configured to extend substantially transversely to a direction of motion of the survey vessel, each of the seismic sensor streamers coupled at a forward end to the spreader cable; and
   two deflectors adapted to spread the seismic sensor streamers substantially transversely to the direction of motion of the survey vessel, wherein one of the deflectors is coupled at each end of the spreader line;
   two electromagnetic sensor streamers configured to be towed by the survey vessel, wherein each of the two electromagnetic sensor streamers are configured to be towed from a separate one of the two deflectors, and wherein each of the two electromagnetic sensor streamers are configured to be towed at a greater depth than the seismic survey spread; and
   a central electromagnetic sensor streamer configured to be towed from the survey vessel.

15. The system of claim 14, wherein the two electromagnetic sensor streamers electromagnetic sensor streamers are configured to achieve a spread of at least about 150 meters.

16. The system of claim 14, wherein the two electromagnetic sensor streamers are configured to be towed at a depth of at least about 100 meters, and wherein the seismic sensor streamers are configured to be towed at a depth up to about 25 meters.

17. The system of claim 14, wherein the two electromagnetic sensor streamers each comprise a hydrodynamic depressor at a forward end of the electromagnetic sensor streamer, and a lateral force and depth control device disposed on the electromagnetic sensor streamer.

18. A method for geophysical surveying, comprising:
towing a geophysical sensor streamer spread through a body of water;
spreading the geophysical sensor streamer spread with at least deflectors; and
towing one or more electromagnetic sensor streamers from the deflectors through the body of water, each of the one or more electromagnetic sensor streamers being towed from a separate one of the deflectors, and each of the one or more electromagnetic sensor streamers being towed at a depth greater than the geophysical sensor streamer spread.

19. The method of claim 18, further comprising:
detecting signals using the geophysical sensor streamer spread while the geophysical sensor streamer spread is towed through the water; and
detecting signals using the electromagnetic sensor streamers while the electromagnetic sensor streamers are towed through the water.

20. The method of claim 18, wherein the towing the geophysical sensor streamer spread through the body of water comprises towing seismic sensor streamers through the body of water and towing the deflectors through the body of water, wherein the deflectors provide a lateral component of force to separate the seismic sensor streamers from one another.

21. The method of claim 18, wherein towing one or more electromagnetic sensor streamers comprises towing two electromagnetic sensor streamers from the deflectors, and wherein the method further comprises towing a central electromagnetic sensor streamer between the two electromagnetic sensor streamers, wherein the central electromagnetic sensor streamer is towed from a survey vessel and not the deflectors.

22. The method of claim 21, wherein the central electromagnetic sensor streamer is towed at substantially the same depth as the two electromagnetic sensor streamers.

23. The method of claim 21, wherein the central electromagnetic sensor streamer is towed at a different depth than the two electromagnetic sensor streamers.

24. The method of claim 18, wherein the one or more electromagnetic sensor streamers are towed at a depth of at least about 25 meters while the geophysical sensor streamer spread is towed at a depth up to about 25 meters.

* * * * *